DECODING CIRCUIT

Filed May 1, 1964 2 Sheets-Sheet 1

INVENTOR.
JOHN T. WINKLER
EDWIN F. SMITH JR.
BY Michael A. Siles, Jr.
ATTORNEY

Feb. 20, 1968 J. T. WINKLER ET AL 3,370,288

DECODING CIRCUIT

Filed May 1, 1964 2 Sheets-Sheet 2

INVENTOR.
JOHN T. WINKLER
EDWIN F. SMITH JR.
BY Michael A. Sileo Jr.
ATTORNEY 3,370,288

DECODING CIRCUIT

John T. Winkler, Orlando, Fla., and Edwin F. Smith, Jr., Sierra Vista, Ariz., assignors to Martin-Marietta Corporation, Middle River, Md., a corporation of Maryland Filed May 1, 1964, Ser. No. 364,261
5 Claims. (Cl. 340—347)

This invention relates to a novel decoding circuit used in combination with a conventional counter for independently representing a plurality of digit numbers contained in the counter, and more particularly to a unique transistorized ring counter decoding circuit having a plurality of discrete outputs each respectively indicative of only one of the plurality of digit numbers contained in the ring counter, which decoding circuit advantageously reduces the quantity of circuit components necessary to accurately decode such digit numbers, thereby considerably reducing the size and weight of the decoding circuit and rendering its use highly desirable in man-portable electronic systems and aerospace environments.

In the past several years, extensive research efforts have been expended to reduce the size and weight of electronic circuits. Miniature tubes, the transistorizing of electronic circuits, and the microminiaturization of many circuit components are the results of such research efforts. In more recent research efforts, thin-film techniques have been utilized to further reduce the size and weight of electronic circuits. Of course, thin-film techniques can only reduce the size of the components required in the circuit to be thin-filmed, and generally do not result in a reduction of the number of necessary components in such circuit. Accordingly, researchers have more recently directed their efforts toward a reduction in the number of components required to perform a desired electronic function. In this respect, more than merely a redesign of existing circuits has resulted. In many instances, completely new and novel circuits have been discovered which can perform the same electronic function as prior known circuits, yet require considerably fewer components to do the job.

The advent of increased activity in aerospace electronics has provided a catalytic effect upon industries research efforts to reduce the size and weight of electronic circuits. In this respect, industry has exhibited a strong interest in microminiaturizing electronic systems for use either by military personnel in a portable or easily movable environment or in an aerospace system where weight is a serious problem. This increased demand for microminiaturization of electronic circuits has further challenged the creativity of today's electronics researcher and designer. The present invention is the result of such increased industrial desires to reduce the size and weight of electronic devices.

The present invention is primarily directed toward a novel decoding technique for use with ring counters which advantageously requires considerably less components to perform an accurate decoding function.

In the art of decoding conventional counting circuits, particularly ring counters, either a considerably complex diode matrix or an expensive and complex transistor logic circuit has been heretofore required in order to decode the plurality of circuit conditions or states of the counter. In most counters each discrete circuit state thereof is utilized to represent a discrete digit number, and generally such conventional counters require an independent two-state device for each digit number to be represented.

By way of example, in a decade counter, ten two-state devices are generally required to provide ten discrete circuit states of the counter for correspondingly representing the digits zero to nine. In a ring counter, however, only five such two-state devices are generally required to provide ten discrete outputs, providing the last two-state device is connected to the first so as to form a somewhat closed-loop circuit arrangement. Thus, it is known that by using both states of each of the five two-state devices as an output, ten discrete circuit states are provided which can be advantageously utilized to represent ten discrete digit numbers, such as zero to nine and yet advantageously decrease the number of required two-state devices.

In decoding a conventional ring counter, a plurality of well-known display devices, such as neon tubes or the well-known nixie tube, are respectively coupled in circuit to the ten discrete outputs of the ring counter to represent, for example, any digit between zero to nine. Of course, several ring counters may be cascaded so that a count exceeding nine may be performed. For example, two cascaded ring counters provide a count of ninety-nine; whereas three cascaded ring counters provide a count of nine hundred and ninety-nine, and so forth as additional ring counters are added.

Circuit designers in the past, however, have found it necessary to utilize expensive and complex logic circuitry to advantageously utilize the ten discrete outputs of the ring counter. That is to say, in detecting or decoding any one of the discrete outputs of the ring counter, it has been heretofore necessary to analyze and process through complex circuitry all of the ten discrete outputs and to provide ten display means each of which is designed in the circuit so as to be responsive only to one set of such discrete conditions. Although this technique advantageously permits the designer to let each display device represent a digit number, considerable expense and complexity, which undesirably increases the size of the electronic circuit, was required.

It will be apparent here that insofar as decoding ring counters are concerned, design and development has been primarily directed toward a reduction in the complexity, size and weight of the decoding circuit.

In accordance with the present invention, a conventional ring counter having, for example, ten discrete outputs is utilized in a unique combination with ten transistorized display devices. Briefly, each of the ten outputs of the ring counter are directly coupled without actual capacitive elements to only two of the ten display devices. By this novel coupling arrangement of the ten discrete outputs, circuit logic can be arranged so that only one display device will be energized during each discrete output condition of the ring counter, and such circuit logic is advantageously attained without the heretofore necessary diode matrix or elaborate gating circuitry. Accordingly, as the ring counter sequentially sweeps through its ten discrete output conditions, the display devices are sequentially energized when the ring counter is appropriately triggered, of course, by input signals, such as a train of pulses. This independent energization of the display devices may be utilized to independently indicate the application of one to nine pulses to the ring counter.

In a brief but more specific reference, the present invention utilizes a conventional transistor for decoding each of the ten discrete outputs of the ring counter with each output terminal of the ring counter being directly connected to the base circuit of a respective one of the ten transistors. The emitter circuit of each transistor is by design connected to an output terminal of the ring counter which is different from the output terminal connected to their respective base circuit. The criteria for selecting which output terminal is to be connected to each transistor is based upon a logical determination that when a high potential signal is connected to the base circuit of any one transistor at the same time that a low potential signal is connected to the emitter circuit of that same transistor, such transistor will conduct. In addition, it is necessary that no other transistor of the circuit receives biasing signals of this same nature at this same time. In other words, when one signal or counting pulse is applied to the ring counter, only one transistor will have its base circuit biased high and its emitter circuit biased low. All other transistors, therefore, will either have their emitter and base circuits both biased high or both biased low, or they will have their base circuits biased low while their emitter circuits are biased high. The next circuit requirement is to respectively couple the transistors to a corresponding number of indicators, such as nixie tubes or neon tubes, so that such transistors operate in circuit as drivers for the indicators, whereby such indicators are responsive only when their respective transistor is conducting. Finally, the transistors are uniquely connected in circuit so as to perform the above mentioned logic determination. This unique circuit arrangement involves the direct connection of the emitter circuit of each transistor to the base circuit of the next succeeding transistor circuit, with the emitter circuit of the last transistor being directly connected to the base circuit of the first transistor. By this circuit arrangement, as the ring counter sequentially counts through its ten discrete states, the transistors will be sequentially biased into conduction. Of course, the indicators will be similarly driven into operation with respect to their associated transistor.

Accordingly, if three input pulses, for example, are applied to the ring counter, the transistor which has been predeterminedly connected in circuit to represent the digit number three will be conducting and its associated indicator will be ignited so as to visually indicate the digit number three, whereas all other transistors in the decoding circuit will be non-conducting. Similarly, this one-transistor conducting condition will occur when any number of input pulses are applied up to, of course, the digit number capacity of the ring counter.

In addition to the foregoing features, the present invention also provides a single load impedance for the transistors and indicators so as to advantageously provide means for preventing a second indicator from operating due to inherent leakage currents of its associated driving transistor, thereby eliminating the possibility of false counting or plural indicating.

It is, accordingly, a primary object of the present invention to provide a novel decoding circuit for us in combination with a conventional counter.

Another object of the present invention is to provide an accurate, high speed and reliable decoding circuit.

Another object of the present invention is to provide a unique transistorized decoding circuit for independently representing a plurality of digit numbers contained in the counter yet not require expensive diode matrix decoding means or complex transistor logic circuitry.

Another object of the present invention is to provide a novel transistorized decoding circuit for use in combination with conventional ring counters which advantageously reduces the number of circuit components necessary to accurately decode the digit numbers contained in the counter, thereby considerably reducing the size and weight of the decoding circuit and render its use highly desirable in man-portable electronic systems and aerospace environments.

Another object of the present invention is to provide a unique transistorized decoding circuit for use in conjunction with conventional ring counters which advantageously minimizes the need for decoding elements for coupling the ten discrete outputs of the counter to the ten transistors and their respective indicators, and which uniquely requires a minimum of circuit components to perform the decoding function.

These and further objects and advantages will become more apparent upon reference to the following description and claims and the appended drawings wherein:

FIGURE 1 sets forth a transistorized circuit diagram of the novel decoding circuit of the present invention.

FIGURES 2–3 are truth tables of the ring counter of FIG. 1 with FIG. 2 showing the voltage condition at five of the output terminals of the ring counter of FIG. 1 during each of the ten discrete output conditions thereof, while FIG. 3 shows the voltage condition at the other five output terminals of the ring counter of FIG. 1 during each of such ten discrete output conditions.

FIGURE 4 depicts the minimum logic showing which two ouput terminals of the ring counter of FIG. 1 are at the proper voltage condition to bias one of the transistors of FIG. 1 into conduction during the zero thru nine output of the counter.

For purposes of simplicity and understanding, the preferred embodiment of the present invention as depicted in FIGURES 1–4 and as described in detail herein below, is combined in circuit arrangement with a five stage ring counter having ten discrete output conditions, such as the ring counter disclosed in U.S. Letters Patent No. 2,416,095 issued Feb. 18, 1947. It is to be understood, of course, that the novel decoding circuit of the present invention may be utilized in combination with other types of ring counters as well as with other types of counting circuits without departing from the spirit and scope of the present invention.

Since it is advantageous to minimize the power consumed by high speed storage circuits, such as ring counters during storage intervals, applicant's Power Saving Storage Circuit patent application, Ser. No. 310,253, filed Sept. 20, 1963, assigned to the assignee of the present invention, may be utilized to reduce the size and weight of the required power supply. This particular storage circuit is highly desirable in the event that the present invention is contemplated for use in man-portable electronic systems or satellite applications where size and weight are critical factors.

Figures 1, 2, 3, 4:
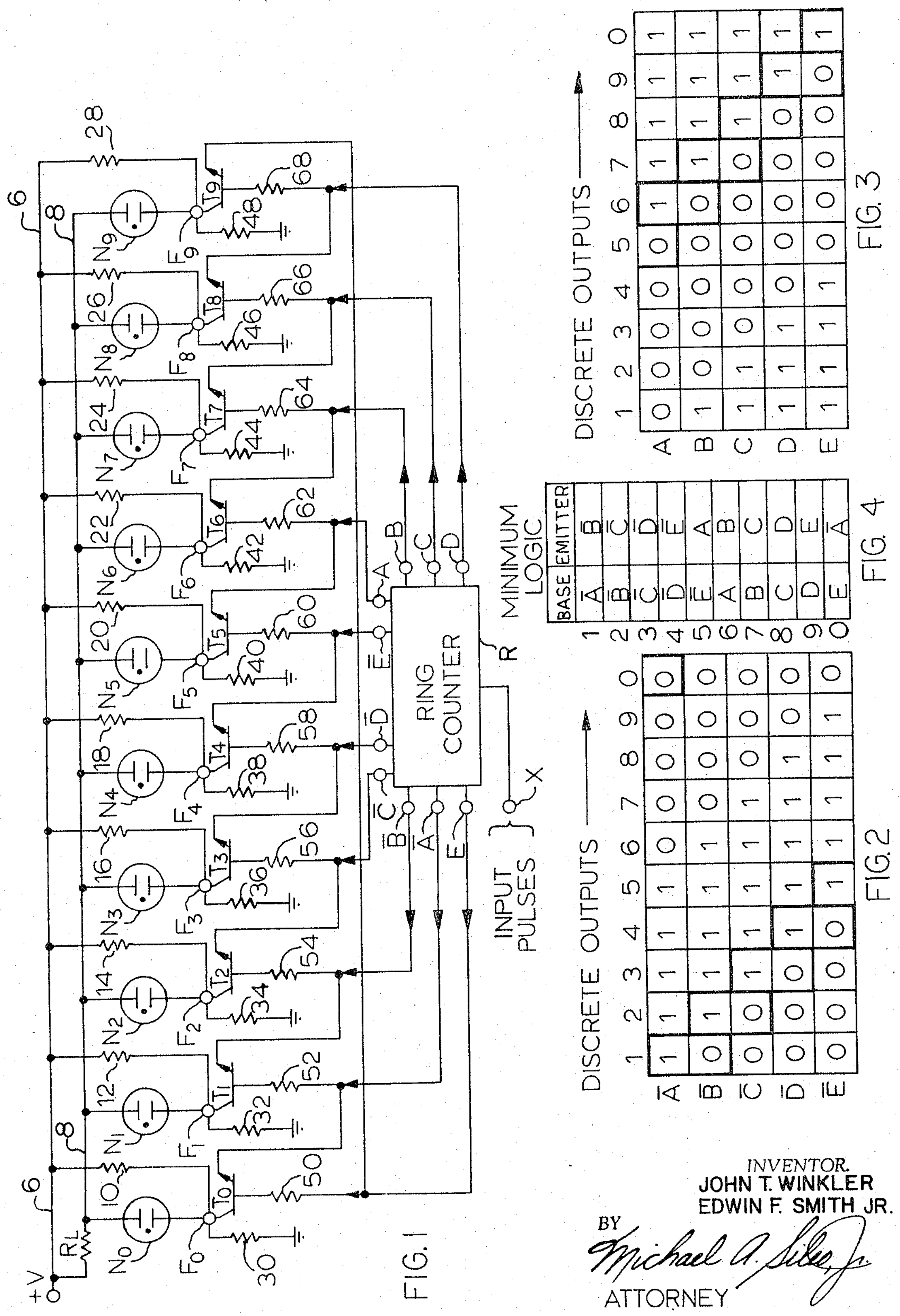
Figure 5:
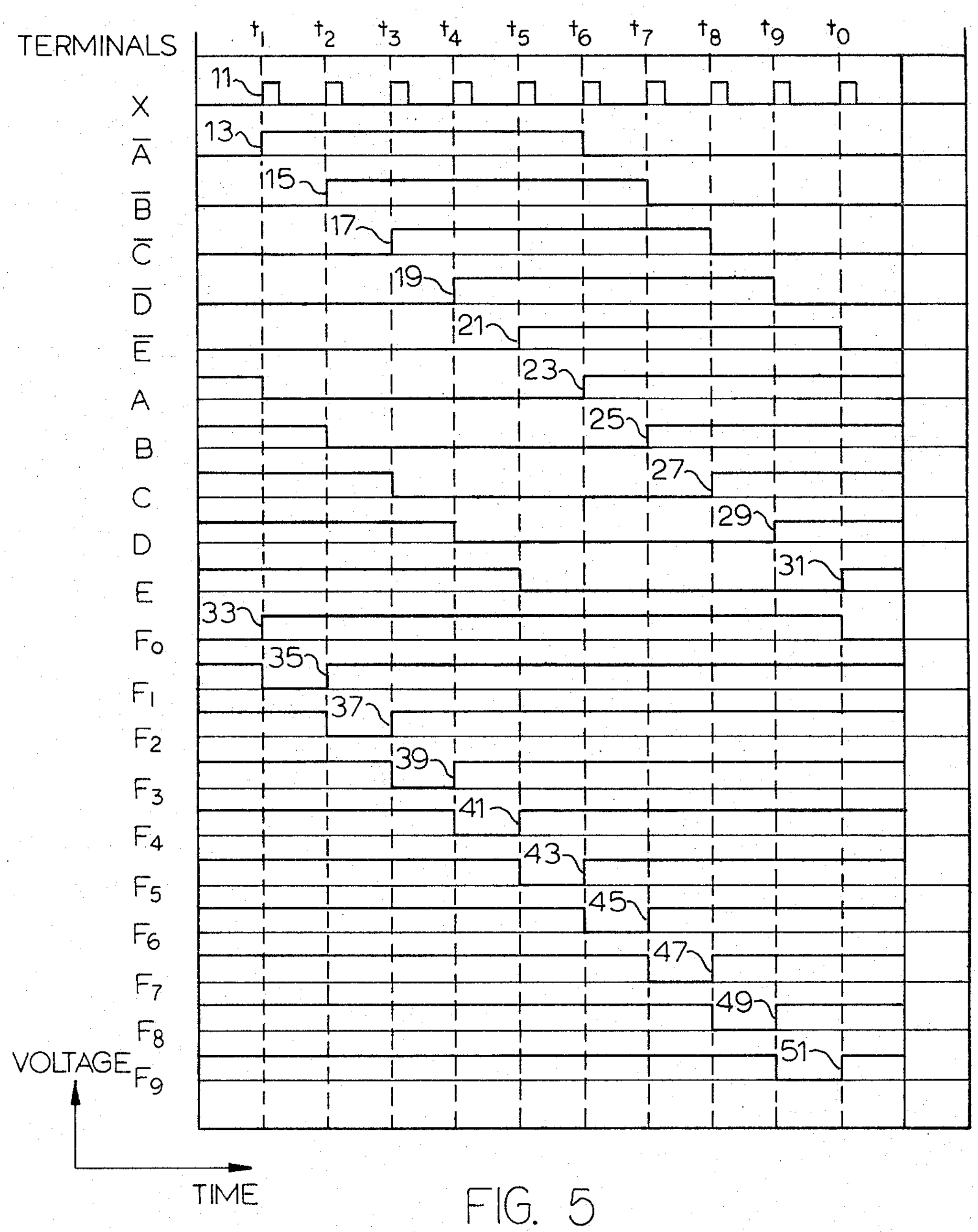
FIGURE 5 shows waveforms present at several appropriate terminals in the circuit diagram of FIG. 1. The vertical dashed lines of this figure represent pertinent time periods and are included to assist in the detailed description of the present invention.

Referring now in detail to the circuit of FIGURE 1 in light of the truth tables of FIGURES 2–3, the minimum logic diagram of FIGURE 4 and the waveforms of FIGURE 5, a ring counter R is provided for developing ten discrete outputs respectively at its ten output terminals $\overline{A}$ to $\overline{E}$ and A to E in response to input pulses applied to its input terminal X. The output terminals $\overline{A}$ to $\overline{E}$ and A to E are directly connected to the base electrodes of transistors $T_1$ to $T_9$ and $T_0$, respectively, via resistors 50 to 68, respectively.

Transistors $T_0$ to $T_9$, which may hereinafter be referred to as three-terminal devices are connected in the circuit as drivers for the neon indicator tubes $N_0$ to $N_9$, respectively. As will be discussed in greater detail later, transistors $T_0$ to $T_9$ are uniquely connected in circuit with respect to each other and the output terminals $\overline{A}$ to $\overline{E}$ and A to E of the ring counter R so as to accurately perform a decoding function regarding the ten discrete output conditions of the ring counter R. That is to say, by virtue of the novel circuit arrangement of transistors $T_0$ to $T_9$, when the ring counter counts through its ten discrete output conditions in response to input pulses applied to terminal X, or for that matter as the ring counter changes from any one of its output conditions to any other of its output conditions, only one of the transistors $T_0$ to $T_9$ will be conducting and of course only the neon tube associated with such conducting transistor will be ionized.

The collector electrodes of the transistors $T_0$ to $T_9$ are respectively connected to the output terminals $F_0$ to $F_9$ which terminals are respectively connected to the conductor or +V buss bar 6 via resistors 10–28. Output terminals $F_0$–$F_9$ are also respectively connected to ground via resistors 30–48. The neon tubes $N_0$ to $N_9$ are connected between the conductor 8 and their respective output terminal $F_0$ to $F_9$, while conductor 8 is connected to $+V$ via the common load resistor $R_L$.

It is essential to the proper operation of the neon tubes $N_0$ to $N_9$ that the voltage at each of the terminals $F_0$ to $F_9$ is sufficiently close to the voltage on conductor 8 so as to prevent neon tubes $N_0$ to $N_9$ from ionizing when its respective transistor, $T_0$ to $T_9$, is not conducting. This potential, which is below the ionization potential of the neon tubes $N_0$ to $N_9$, is provided by appropriately selecting the size of resistors 10 to 28 with respect to their associated resistors 30 to 48, all in light of the voltage of the $+V$ source and the size of load resistor $R_L$. That is to say, looking, for example, at the zero indicator $N_0$, the voltage at terminal $F_0$, which is developed by the voltage divider comprising resistors 10 and 30, must be sufficiently close to the voltage on conductor 8, which is developed by load resistor $R_L$, so that the voltage difference across the plates of neon tube $N_0$ is insufficient to ionize the gas therein. Note here that this neon tube ionization inhibition feature is only effective so long as the driving transistor $T_0$ is biased into its non-conducting state, for as will be seen hereinafter when transistor $T_0$ is conducting, the potential at terminal $F_0$ is dropped to a level such that the potential difference across the plates of the neon tube $N_0$ is sufficient to ionize the tube.

The base electrodes of transistors $T_0$ to $T_9$ are respectively connected to the output terminals E, $\overline{A}$ to $\overline{E}$ and A to D of the ring counter R via resistors 50 to 68, respectively; whereas the emitters of transistors $T_0$ to $T_9$ are respectively connected to the output terminals $\overline{A}$ to $\overline{E}$ and A to E. Note here that the base and emitter electrodes of transistor $T_0$ are each connected to a different one of the terminals of ring counter R. Thus it will be seen in the case of the transistor $T_0$ that it will be biased into its conductive state only when the potential at terminal E, which is applied to the base electrode of $T_0$, is high with respect to the potential at terminal A, which is applied to the emitter electrode of $T_0$. It is important to further note that the potentials developed by ring counter R, which respectively appear on terminals $\overline{A}$ to $\overline{E}$ and A to E, are either a high potential or a low potential. For purposes of understanding the below detailed description of the operation of the decoding circuit of FIG. 1, the high potential developed by ring counter R shall hereinafter be referred to as the ONE state and graphically represented by the digit 1, and the low potential developed by ring counter R shall hereinafter be referred to as the ZERO state and graphically represented by the digit 0. Note also that the base and emitter electrodes of each of the remaining driving transistors $T_1$ to $T_9$ are also respectively coupled to two of the output terminals $\overline{A}$ to $\overline{E}$ and A to E of the ring counter R, and such transistors function in exactly the same manner as above described with regard to transistor $T_0$ in response to the potentials at their associated output terminals of ring counter R. Similarly, the circuit connections of neon tubes $N_1$ to $N_9$ and transistors $T_1$ to $T_9$ are exactly the same as above described with regard to neon tube $N_0$ and transistor $T_0$, and for the same general purpose.

It will be apparent at this point that as the ring counter R sweeps through its range of ten discrete output conditions in response, of course, to a train of ten input pulses, and thereby causing some or all of the potentials at the output terminals $\overline{A}$ to $\overline{E}$ and A to E to change from one voltage state to another in an orderly and logical sequence, one half of the output terminals of the ring counter R, at any instant, will be in their ZERO state while the other half will be in their ONE state. However, the transistors are, in accordance with this invention, connected to the counting means in such a manner that during any one count or condition, only one transistor has its base electrode connected to an output terminal which is in its ONE state and its emitter electrode connected to an output terminal which is in its ZERO state. Only that one transistor will be driven into conduction, with any other transistor of the circuit being driven into conduction only when the counting means has changed its count or condition. Thus, the counting function can advantageously proceed as each transistor is successively driven into conduction during each discrete count or output condition of ring counter R. The present invention uniquely performs this decoding operation without requiring a complex diode matrix or transistor logic circuit to decode the discrete output conditions of ring counter R.

In order to fully understand the novel decoding circuit of FIG. 1, the truth tables of FIGS. 2–3, the minimum logic chart of FIG. 4, and the waveforms of FIG. 5 have been included. Referring first to FIGS. 2–3, the horizontal direction of these figures represents the digit numbers of the ring counter R, whereas the vertical direction represents the output terminals of ring counter R. By selecting, for example, the $\overline{C}$ terminal, each number running sequentially from left to right represents the potential state on terminal $\overline{C}$ when the ring counter R is in any one of its ten discrete output conditions, i.e., digit numbers. Note here that a rather interesting and special condition exists in the truth tables of FIGS. 2–3 when they are viewed in any vertical column. That is to say, there exists only two consecutive terminals in which a ONE state precedes a ZERO state. A plurality of heavy lines have been included in FIGS. 2–3 to emphasize graphically this special condition.

The novel decoding circuit of FIG. 1 advantageously utilizes the foregoing special condition of ring counter R by arranging the transistors $T_0$ to $T_9$ in circuit so that only one base electrode thereof during any one digit number is conected to the ONE state output terminal of ring counter R which immediately precedes a ZERO state output terminal. Then, the emitter electrode of the transistor, which has its base electrode connected to such ONE state output terminal, is connected to such immediately subsequent ZERO state output terminal. Reference should be made here to the "boxed in" output terminals of FIGS. 2 and 3 during each digit number of ring counter R. Note that such "boxed in" output terminals are respectively connected to the base and emitter electrodes of only one transistor of the decoding circuit of FIG. 1, thereby biasing such transistor into condition. Of course, during any one digit number of ring counter R, no transistor other than the one connected to the "boxed in" output terminals of ring counter R, is biased into conduction. Thus, only one transistor of the decoding circuit of FIG. 1 is conducting during any one of the digit numbers of ring counter R.

Specific reference is now made to FIG. 4. Note that this chart shows the digit numbers 1–9 and 0 in a vertical column with the output terminal which is in its ONE state, positioned horizontally opposite each digit number in a vertical column labeled BASE, and with the immediately subsequent output terminal, which is in its ZERO state, positioned horizontally opposite such digit numbers in a vertical column labeled EMITTER. This figure is included to assist in understanding which ONE state and ZERO state output terminals of the ring counter R are to be respectively connected to the base and emitter electrodes of transistors $T_1$ to $T_9$ and $T_0$ during each digit number of ring counter R.

Reference is now made to the waveforms of FIG. 5. The pulses 11 of this figure are coupled to the input terminal X of the ring counter R, and as each pulse occurs thereon the ring counter R is driven into one of its ten discrete output conditions. The waveforms at terminals $\overline{A}$ to $\overline{E}$ and A to E as each input pulse 11 occurs on terminal X are graphically represented as waveforms 13 through 31. Note that the waveforms 13 through 31 during each time period $t_1$ to $t_{10}$ are either at a high potential or ONE state, or at a low potential or ZERO state. FIG. 5 also includes waveforms 33 through 51 which represent the voltage conditions of the collectors of transistors $T_0$ to $T_9$, respectively. The operation of the decoding circuit of FIG. 1 is as follows:

Immediately prior to time $t_1$, the potentials at terminals $\overline{A}$ to $\overline{E}$, A to E, $F_0$ to $F_9$ and X are shown to the left of the first vertical dashed line of FIG. 5. This voltage condition of these terminals represents the digit number 0. Accordingly, the voltage state at terminals E and $\overline{A}$, which are respectively connected to the base and emitter electrodes of transistor $T_0$, are ONE and ZERO, respectively. Thus, transistor $T_0$ is conducting, thereby dropping the potential at terminal $F_0$ to a level such that the potential difference across the plates of neon tube $N_0$ is sufficient to ionize this tube and visually indicate the digit 0.

At time $t_2$, when the second pulse 11 appears on terminal X, terminal $\overline{A}$ changes to its ONE state and terminal A changes to its ZERO state. Note that terminal $\overline{B}$ remains in its ZERO state, thus providing the condition in which a high potential is applied to the base electrode of transistor $T_1$ while a low potential is applied to the emitter electrode of $T_1$. At this point in time, since no other transistor in this exemplary circuit is biased as is transistor $T_1$, only transistor $T_1$ is conducting and of course only neon tube $N_1$ is ionized so as to indicate the digit number 1.

At times $t_2$ to $t_9$, when the third to ninth input pulses 11 sequentially appear on terminal X, the transistors $T_2$ to $T_9$ are sequentially driven into conduction, thereby sequentially ionizing the neon tubes $N_2$ to $N_9$ in correspondence with the sequential conducting states of transistors $T_2$ to $T_9$. Accordingly, the decoding circuit of FIG. 1 will sequentially indicate the digit numbers 2 to 9.

At time $t_{10}$, when the tenth input pulse 11 occurs on terminal X, the output condition of the ring counter R changes to or returns to the condition it was in just prior to the occurrence of the first input pulse 11. Thus, the neon tube $N_0$ will be ionized and indicate once again the digit number 0. Of course, when the ring counter returns to its original output condition, i.e., digit number 0, means to detect this state and a second decoding circuit associated therewith may be incorporated to provide a capacity to indicate 99 discrete numbers without departing from the spirit and scope of the present invention. Subsequent decoding circuits may also be included to increase indicating capacity, if desired, and such subsequent circuits are clearly considered within the scope of this invention.

It should now be understood that the neon tubes $N_0$ to $N_9$ will be ionized only when their corresponding transistors are conducting. This feature is clearly highly desirable, and to insure that no more than one neon tube ionizes during any one discrete output condition of ring counter R, load resistor $R_L$ is included. That is to say, in the event that any transistor in this circuit draws excessive leakage currents, the slight decreased voltage at the collector electrode of such transistor will be adequately compensated for by the drop in voltage on conductor 8 with respect to the voltage on conductor 6. Therefore, inherent or undesirable leakage current in the emitter-collector circuits of any one of the transistors $T_0$ to $T_9$ will not result in any undesirable ionization of such transistor's corresponding neon tube. Thus, the conduction of any one transistor provides the necessary voltage drop across the common load resistor $R_L$ to advantageously prevent false counting or plural indication.

It is to be understood, of course, that the number of input pulses applied to terminal X will vary with respect to the desired digit number to be indicated, or conversely the number of pulses counted by the ring counter R will be indicated by the ionization of the appropriate neon tube.

It is to be understood further, that other well known counting circuits may be substituted for the ring counter R so long as such counting circuits provide a plurality discrete output conditions to be decoded. Additionally, other well known indicating means, such as a nixie tube, may be substituted for the neon tubes $N_0$ to $N_9$ without departing from the spirit and scope of the present invention.

For exemplary purposes only, the following parameters and performance data are included:

Ring counter R—5-stage with push-pull outputs.
Transistors $T_0$–$T_9$—2N1893.
Indicators $N_0$–$N_9$—Neon bulb.
+V Source—170 volts.
Resistor $R_L$—68K ohms.
Resistors 10–28—680 ohms.
Resistors 30–48—680 ohms.
Resistors 50–68—5K ohms.
Output levels from counter—+3 volts for ONE state, 0 volts for ZERO state.

It will be apparent from the foregoing, that the present invention provides an accurate, high speed and reliable decoding circuit for use in combination with a conventional counting circuit, such as a ring counter, which advantageously reduces the number of circuit components necessary to decode the digit numbers contained in such counting circuit, thereby considerably reducing the size and weight of the decoding circuit and rendering its use highly desirable in man-portable electronic systems and aerospace environments.

The terms and expressions which have been employed herein are used as terms of description and not of limitation and it is not intended, in the use of such terms and expressions, to exclude any equivalents of the features shown and described, or portions thereof, but it is recognized that various modifications are possible within the scope of the present invention.

Without further elaboration, the foregoing is considered to explain the character of the present invention so that others may, by applying current knowledge, readily adapt the same for use under varying conditions of service while still retaining certain features which may properly be said to constitute the essential items of novelty involved, which items are intended to be defined and secured by the appended claims.

We claim:

1. A decoding circuit for use with counting means having a series of outputs which have high and low output voltages thereon to collectively represent any one of a finite number of digits contained in said counting means, said decoding circuit comprising, in combination:

(a) a plurality of three terminal active devices corresponding in number to the finite number of digits contained in said counting means;
(b) each of said devices having two distinct conductivity states, with each device being in its first conductivity state when its first terminal is at a voltage level equal to or less than the voltage level on its second terminal, and in its second conductivity state when its first terminal is at a voltage level greater than the voltage level on its second terminal;
(c) said first and second terminals of each of said devices being connected to respective pairs of outputs of the counting means so that only one device of said plurality of devices will be in its second conductivity state when said counting means is collectively representing any one of the finite number of digits contained in the counting means; and
(d) a plurality of output means respectively associated with the third terminals of said devices, said output means being respectively operative only when its corresponding device is in its second conductivity state, thereby indicating said one digit contained in the counting means.

2. A decoding circuit in accordance with claim 1, wherein:

(a) said counting means is a ring counter having ten output terminals; and (b) said three terminal active devices are transistors respectively connected to said ten output terminals of said ring counter.

3. A decoding circuit in accordance with claim 2, wherein:

(a) said output means are neon tubes.

4. A decoding circuit in accordance with claim 2, wherein:

(a) said output means is a nixie tube having a common emitting cathode, ten input terminals respectively associated with said transistors, and ten collecting plates respectively associated with its ten input terminals.

5. A decoding circuit for independently decording any one of a finite number of digits contained in a ring counter, comprising, in combination:

(a) a ring counter having an input terminal and a plurality of output terminals, said counter being adapted to count to any one of said digits in response to the application of a corresponding number of input pulses to said input terminal, whereby the output signals present on said output terminals, when said counter has counted to any one of said digits, collectively represent said one digit;

(b) a plurality of transistors each having first and second input terminals and an output terminal, said transistors each including a conducting and a non-conducting state;

(c) said first input terminals of said transistors being respectively connected to said output terminals of said counter, and said second input terminals of said transistors being also respectively connected to said output terminals of said counter in a manner such that the first and second input terminals of each of said transistors are connected to a different one of said output terminals of said counter, so that only one of said transistors will be in its conducting state when said output terminals of said counter collectively represent said one digit, and (d) a plurality of indicators respectively connected to said transistor output terminals so that each of said indicators will be respectively energized when its corresponding transistor is in its conducting state, thereby indicating the digit count of said counter.

References Cited

UNITED STATES PATENTS

| | | | |
|---|---|---|---|
| 2,416,095 | 2/1947 | Gulden | 328—43 |
| 2,776,420 | 1/1957 | Woll | 340—252 |
| 2,982,880 | 5/1961 | Klipstein | 235—92 |
| 3,135,875 | 6/1964 | Leightner | 307—88.5 |
| 3,202,831 | 8/1965 | Olson | 307—88.5 |
| 3,225,215 | 12/1965 | Winter | 307—88.5 |

MAYNARD R. WILBUR, *Primary Examiner.*

J. H. WALLACE, *Assistant Examiner.*